United States Patent [19]

Gieseke et al.

[11] Patent Number: 4,699,639
[45] Date of Patent: Oct. 13, 1987

[54] AIR-INTAKE, MOISTURE-ELIMINATOR DUCT APPARATUS

[75] Inventors: Steven S. Gieseke, Richfield; Donald F. Engel, Prior Lake, both of Minn.

[73] Assignee: Donaldson Company, Inc., Minneapolis, Minn.

[21] Appl. No.: 886,545

[22] Filed: Jul. 16, 1986

[51] Int. Cl.⁴ .................................. B01D 50/00
[52] U.S. Cl. .................... 55/385 B; 55/184; 55/436; 55/461
[58] Field of Search ............ 55/183, 184, 199, 385 B, 55/385 F, 434, 436, 461

[56] References Cited

U.S. PATENT DOCUMENTS

| | | | |
|---|---|---|---|
| 2,367,904 | 1/1945 | Ulrich | 98/2.11 |
| 2,634,671 | 4/1953 | Puidokas | 98/2.11 |
| 2,864,299 | 12/1958 | Betts et al. | 98/2.11 |
| 4,131,441 | 12/1978 | Randall | 55/385 R |
| 4,159,196 | 6/1979 | Schneider | 55/436 X |
| 4,212,659 | 7/1980 | Magrini | 55/385 B |
| 4,242,951 | 1/1981 | Bemiss | 98/2.11 |
| 4,366,878 | 1/1983 | Warf | 180/54 A |
| 4,373,940 | 2/1983 | Petersen | 55/328 |

Primary Examiner—Charles Hart
Attorney, Agent, or Firm—Merchant, Gould, Smith, Edell, Welter & Schmidt

[57] ABSTRACT

The present invention is directed to a unitary member formed to fit in the engine compartment of a vehicle and to function to both direct ram air toward the air cleaner and to eliminate moisture from that air. The unitary member includes an intemediate portion between inlet and outlet portions. The intermediate portion has a moisture elimination section with a drain opening.

2 Claims, 5 Drawing Figures

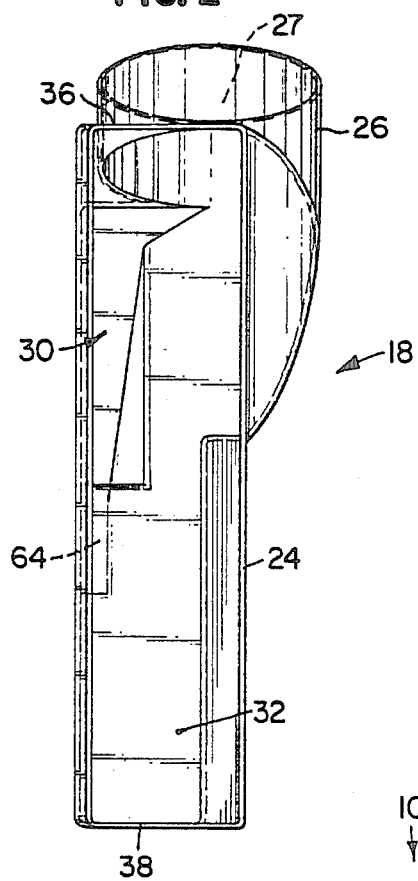
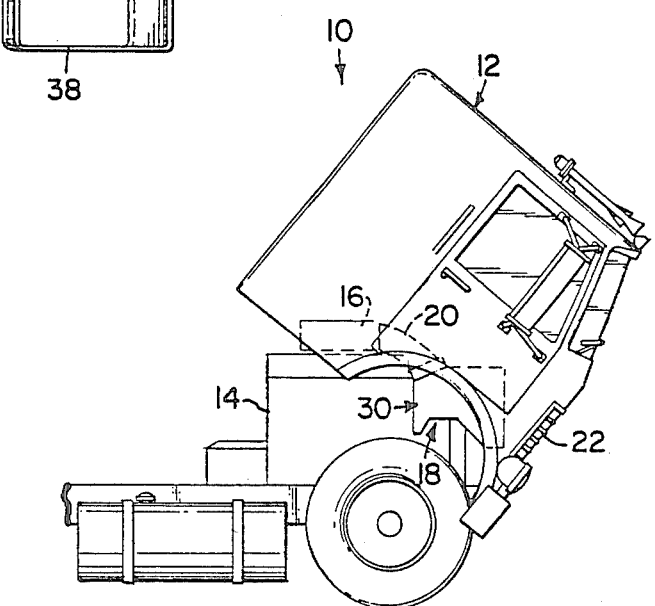
FIG. 2
FIG. 1

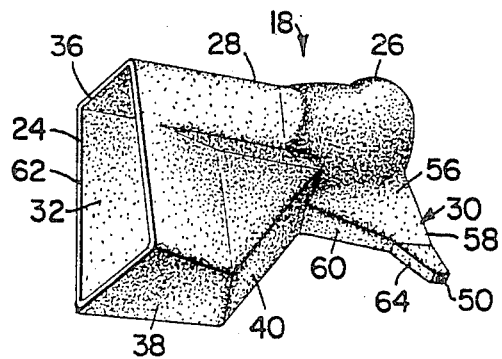
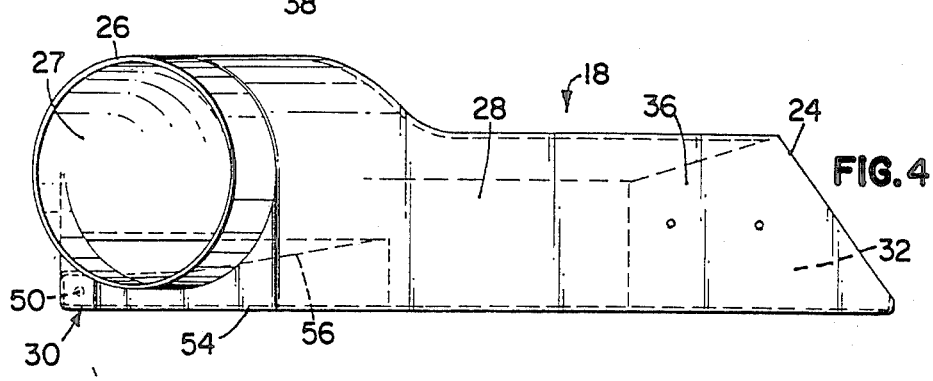
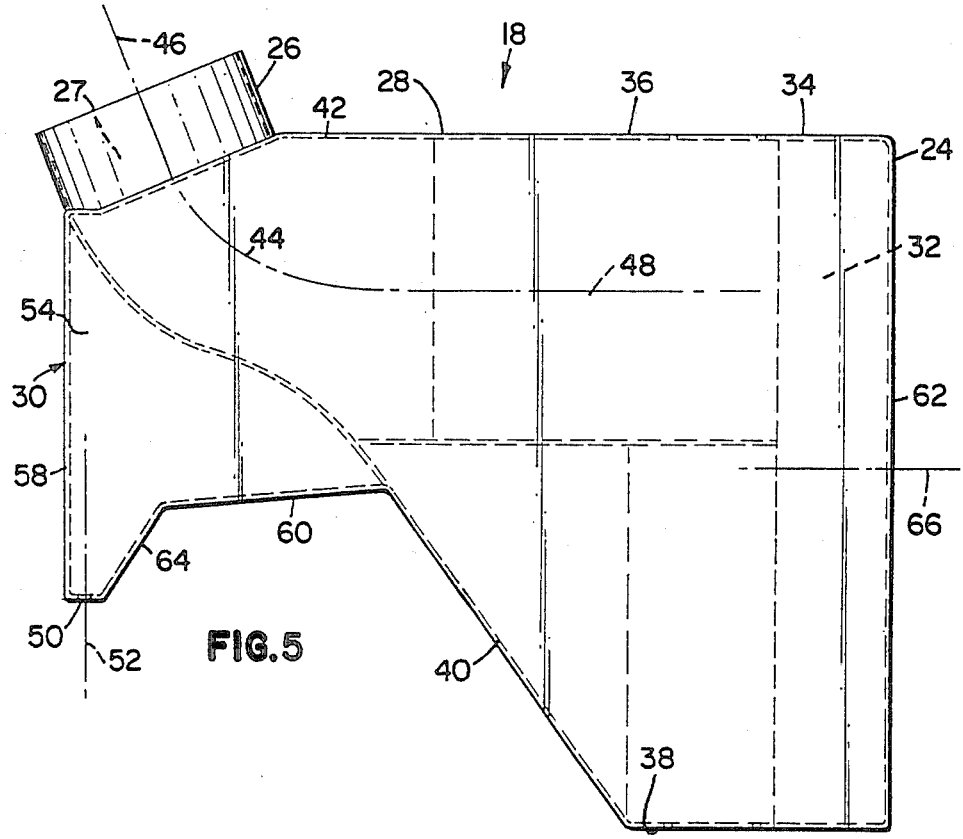

AIR-INTAKE, MOISTURE-ELIMINATOR DUCT APPARATUS

FIELD OF THE INVENTION

The present invention is directed to duct apparatus for intake air leading to the air cleaner of an engine. The duct apparatus includes a moisture elimination portion.

BACKGROUND OF THE INVENTION

It has long been known that internal combustion gasoline or diesel engines must be protected from impurities in air inducted into the engine for combustion. Filters have been developed and are quite efficient for removal of solid particles. Liquid impurities, however, are much more difficult to remove.

In a typical system, a snorkel pipe extending vertically behind the truck cab is open to receive air at the top of the cab and direct it downwardly through the pipe and beneath the cab along a torturous path to the engine filter. The elimination of moisture from such systems has often been provided by a hood or cap at the top of the snorkel pipe, or by filters or restrictions in the snorkel pipe itself. The restrictions are frequently in the form of cross sectional narrowings, configuration changes or tangentially directed veins which cooperate to create a centrifical separation of moisture from air. U.S. Pat. No. 4,366,878 is exemplary of this type of system. Air is received above the cab at a cap opening forwardly. A long snorkel pipe extends from the upper cap downwardly to a foot pipe generally beneath the cab. An additional conduit directs air from the foot pipe to the air cleaner. The foot pipe provides a change of direction from the vertical to the horizontal, as well as a change of configuration from rectangular to cylindrical. The foot pipe includes a low portion with drain means for collecting and draining water. The general idea is that the long free fall in the vertical pipe aided by the change of direction at the bottom of the vertical pipe causes moisture to be directed to the low portion and eliminated at the drain means.

A system intended to eliminate moisture at the air entry cap is exemplified in U.S. Pat. No. 4,212,659. Air enters the cap above a cab before being directed down a vertical pipe behind the cab and then forwardly under the cab to the air cleaner and engine. Air enters a downwardly directed opening and passes through a plurality of parallel vanes having a change of direction in them. Air is directed through the vanes and upwardly against the top of the cap and then is eventually forced downwardly into the vertical pipe. The torturous path causes moisture to gather on the top of the cap and flow down the sides or fall by gravity into annular water traps having discharge openings.

As recognized in the first of the above discussed patents, attempts to eliminate moisture at or near the air cleaner have been unsatisfactory and, therefore, it has been preferred to remove water well upstream from the air cleaner. The present invention, however, is directed to a duct configuration which achieves water elimination near the air cleaner.

SUMMARY OF THE INVENTION

The present invention is directed to an air intake apparatus for an internal combustion engine comprising a unitary member formed as a continuous wall having an inlet portion, an outlet portion and an intermediate portion which includes a moisture elimination section. The inlet and outlet portions include inlet and outlet openings with nonparallel inlet and outlet centerlines, respectively. The wall is formed so that all lines parallel to the inlet centerline and passing through the inlet opening intersect the wall without passing through the outlet opening. The moisture elimination section includes a drain opening with a drain centerline generally having a similar direction as the outlet opening.

The present apparatus is located immediately adjacent to a conventional filter type air cleaner for the engine. The inlet opening is directed generally forwardly to receive ram air, while the outlet opening is located generally upwardly and the drain opening faces generally downwardly. The present apparatus is particularly advantageous since in a one piece member, the functions of both eliminating moisture and directing ram air directly to the air filter and engine are accomplished. As indicated hereinbefore, prior systems have required long, multi-piece ducting with the various pieces cooperating or eliminate moisture. The present apparatus, thus, eliminates the need for many mating components, such as sleeves and clamps. The similification greatly reduces cost while still providing all the necessary functions.

Of further advantage is that the present apparatus allows for a moisture eliminator to be a part of an intake air system for location where present "state of the art" components will not fit and where it is thought in the industry that it is not even possible to fit a system combining the functions indicated.

In addition, the present apparatus does not increase flow restriction even though a moisture elimination occurs in the ducting of the apparatus. Furthermore, moisture elimination functions effectively at flow velocities below present "state of the art" systems. Still further, the present apparatus utilizes gravity and configuration to accomplish the indicated functions and no outside energy source is needed.

These advantages and objects of the present invention can be better understood by now referring to the drawings, briefly described hereinafter, and the detailed description of the preferred embodiment following thereafter.

BRIEF DESCRIPTION OF THE DRAWINGS

FIG. 1 illustrates the side view of a cab of a truck, and an engine compartment under the cab, and apparatus in accordance with the present invention as installed thereon;

FIG. 2 is a front view of apparatus in accordance with the present invention;

FIG. 3 is a view in perspective of the present apparatus;

FIG. 4 is a top view of the present apparatus; and

FIG. 5 is a side view of the present apparatus.

DETAILED DESCRIPTION OF THE PREFERRED EMBODIMENT

Referring now to the drawings wherein like reference numerals designate identical or corresponding parts throughout the several views, and more particularly to FIG. 1, a vehicle 10 in the form of a truck is shown to have a forwardly tilting cab 12 which exposes an engine 14 with an air cleaner 16. An air-intake apparatus 18, in accordance with the present invention, is connected with a short tube 20 to air cleaner 16. Apparatus 20 is located next to the engine and receives the intake air through the grill 22 of cab 12. The location of apparatus 18 with respect to air cleaner 16 and engine 14 is in stark contrast to the prior art, which requires a long ducting system going under and behind cab 12 to receive intake air above the cab.

With reference to FIG. 3, apparatus 18 is a unitary member formed as a continuous wall to direct intake air. Apparatus 18 includes an inlet portion 24 and an outlet portion 26. An intermediate portion 28 is located between inlet and outlet portions 24, 26. Intermediate portion 28 includes a moisture elimination section 30.

Inlet portion 24 is preferably rectangular and has a rectangular inlet opening 32. Inlet portion 24 may be divided into an inlet section 34 and upper and lower sections 36, 38. It is understood that these various sections for the inlet portion and the other portions mentioned have a particular configuration in the preferred embodiment, but may have other configurations as necessary for a particular engine and cab design. In the preferred embodiment, inlet section 34 has a constant cross-sectional shape. Inlet opening 32 is cut along a plane inclined with respect to a transverse cross-sectional plane of inlet section 34 (see FIGS. 4 and 5). Upper section 36 proceeds from inlet section 34 in a constant rectangular cross-sectional shape. Lower section 38 proceeds from inlet section 34 in an ever decreasing rectangular cross-sectional shape. Upper section 36 extends downstream about twice as far from inlet section 32 as lower section 38.

Outlet portion 26 is cylindrically tubular and has a circular inlet opening 27. Intermediate portion 28 provides a mating region between inlet and outlet portions 24, 26. Intermediate portion 28 includes a free form section 42 which generally has an arcuate centerline 44 leading from centerline 46 of outlet portion 26 to centerline 48 of upper section 36. Free form section 42 maintains a width about the same as the diameter of outlet portion 26 until it approaches the generally rectangular shape of upper section 36. Near upper section 36, free form section 42 narrows rapidly to mate with upper section 36.

Intermediate portion 28 also includes triangular section 40 which has approximately parallel sides and fills in the region between lower section 38 and upper section 36, as well as free form section 42. It is understood that there are no walls or baffles separating the various sections or protruding outwardly from any side of a section. In this regard then the inlet section is four sided, while the upper, lower and triangular sections are three sided. The outlet portion is cylindrical, and the free form section is continuous, except as interrupted by the moisture elimination section. The continuous wall of apparatus 18 includes short connecting portions between the various sections, as necessary, to provide a complete enclosure between inlet opening 32 and outlet opening 27, except for drain opening 50 as described hereinafter.

Intermediate portion 28 also includes a moisture elimination section 30. Moisture elimination section 30 includes a drain opening 50 having a centerline 52. Inlet and intermediate portions 24, 28 include a common portion 54 of the continuous wall which forms apparatus 18. Common wall portion 54 is along a first plane. Thus, except for the cylindrical outlet portion 26, apparatus 18 has one completely flat side. Common portion 54 forms one side of moisture elimination section 30. The other side of moisture elimination section 30 is a second portion 56 of the continuous wall that lies along a second plane which is inclined with respect to the first plane of common portion 54. Connecting sides 58 and 60 extend between common and second portions 54 and 56 of moisture elimination section 30 to generally form a trough for directing moisture to reservoir 64 and drain opening 50. When apparatus 18 is oriented for proper installation, the side 58 which is approximately parallel with a longer edge 62 of inlet portion 24 is approximately vertical. A side 60 almost forms a right angle with respect to side 58 and is slightly inclined downwardly as it approaches side 58. A small reservoir 64 is formed as an extension of side 60 in the region just before side 60 reaches side 58. Reservoir 64 includes drain opening 50. In this way, drain opening 50 is at the lowermost location in the various connecting sides. It is also noted that centerline 52 of drain opening 50 is generally along a similar direction as centerline 46 of outlet opening 26, although the two centerlines may be slightly inclined as shown in the preferred embodiment.

It is noted that the intermediate portion 28 between inlet portion 24 and outlet portion 26 is crucial to the elimination of moisture as inlet air is received and directed by apparatus 18. As air flows in the lower section of input portion 24, it is subjected to a shaft restriction and then a ramp end wall at triangular section 40. Centrifugal force and momentum cause moisture particles to impact the ramp end wall, and the speed of the air forces the moisture which gathers on the end wall, upwardly to the moisture elimination section 30, where the moisture is directed by gravity and the flow direction of air at that location along side 60 to reservoir 64 and drain opening 50. Air entering input portion 24 along the upper half is not restricted. The air flows downstream and, again, even through the air starts to change direction, the centrifugal force causes moisture particles to impact the wall at the downstream end of free form section 42. Moisture gathers on the wall and under the force of gravity flows sidewardly to moisture elimination section 30 and downwardly along its walls into reservoir 64 and drain opening 50. In this regard, it is important to note that all lines parallel to inlet portion centerline 66 and passing through inlet opening 32 intersect the wall of apparatus 18 before passing through outlet opening 27. In this way, moisture particles are quite likely to continue because of momentum and centrifugal force along an established flow line and impact a wall and be retained to flow under gravity into moisture elimination section 30, rather than reflecting and being directed in an almost 90 degree direction to the outlet opening 27 of outlet portion 26.

To use, apparatus 18 is fastened in a conventional way inside the engine compartment of a vehicle, as represented in FIG. 1. Apparatus 18 is oriented so that lines perpendicular to a cross section of inlet portion 24 are directed preferably parallel to air coming through the grill of the vehicle. In this way, air is rammed or flows at a velocity into apparatus 18. As previously described, moisture is eliminated and air is directed. Usually, a tube 20 is installed between outlet portion 26 and an air filter unit 16. In any case, tube 20 is representative of placing output air in fluid communication with the air cleaner 16. Preferably, apparatus 18 may be located so that moisture may dip from drain opening 50 and will fall through to the ground. If necessary, however, a tube is attached to drain opening 50 to direct water or other liquids enetering reservoir 64 through the engine compartment to the ground.

Thus, apparatus 18 in a compact unitary member which accomplishes both the functions of receiving and directing air from a close proximity location to the air cleanwer or a short tube in fluid communication with the air cleaner of an engine and at the same time eliminating moisture from the air. Although shape is important to the present invention, and advantages result from the disclosed shape, it is understood that the preferred embodiment is exemplary and to the full extent extended by the general meaning of the terms in which the appended claims are expressed, changes made in shape and size are within the principle of the present invention.

What is claimed is:

1. An air-intake apparatus for a vehicle having an engine and an air cleaner for supplying cleaned air to the engine, comprising:

a unitary member formed as a continuous wall having a rectangular inlet portion and a cylindrical outlet portion, said inlet and outlet portions having inlet and outlet centerlines nearly at right angles with respect to one another, said unitary member including an intermediate portion wherein said rectangular inlet portion mates with said cylindrical outlet portion, said intermediate portion including a free form section and a moisture elimination section, said moisture elimination section having a drain opening with a centerline having direction generally similar to said outlet centerline, said continuous wall of said unitary member formed so that all lines parallel to said inlet centerline and passing through said inlet opening intersect said wall without passing through said outlet opening, said member reducing in cross-section as it proceeds from said inlet opening to said free form section to direct intake air and to begin separating moisture from the intake air.

2. Apparatus in accordance with claim 1 wherein said moisture elimination section and said inlet and intermediate portions include a common portion of said continuous wall, said common portion being along a first plane, said moisture elimination section further including a second portion of said wall along a second plane inclined with respect to said first plane, said moisture elimination section also having connecting portions between said common and second portions to form a trough for directing moisture to said drain opening, said drain opening being at a lowermost location in said connecting portions.

* * * * *